(12) United States Patent
Hintzer et al.

(10) Patent No.: US 6,803,425 B2
(45) Date of Patent: Oct. 12, 2004

(54) FLUOROPOLYMERS HAVING PENDANT IMIDATE STRUCTURES

(75) Inventors: Klaus Hintzer, Kastl (DE); Werner M. A. Grootaert, Oakdale, MN (US); Robert E. Kolb, Afton, MN (US); Franz Maerz, Burgkirchen (DE); Werner Schwertfeger, Altötting (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/122,487

(22) Filed: Apr. 11, 2002

(65) Prior Publication Data

US 2002/0183457 A1 Dec. 5, 2002

Related U.S. Application Data

(60) Provisional application No. 60/283,462, filed on Apr. 12, 2001.

(51) Int. Cl.⁷ .................................................. C08F 8/14
(52) U.S. Cl. .................... 525/326.2; 525/384; 526/247; 526/248
(58) Field of Search .............................. 525/326.2, 384; 526/247, 248

(56) References Cited

U.S. PATENT DOCUMENTS

| | | |
|---|---|---|
| 3,523,132 A | 8/1970 | Dorfman et al. |
| 3,546,186 A | 12/1970 | Gladding et al. |
| 3,686,143 A | 8/1972 | Bowman |
| 4,281,092 A | 7/1981 | Breazeale |
| 4,487,903 A | 12/1984 | Tatemoto et al. |
| 4,694,045 A | 9/1987 | Moore |
| 4,762,891 A | 8/1988 | Albin et al. |
| 4,833,212 A | 5/1989 | Yamada et al. |
| 4,882,390 A | 11/1989 | Grootaert et al. |
| 4,948,853 A | 8/1990 | Logothetis |
| 4,972,038 A | 11/1990 | Logothetis |
| 4,983,680 A | 1/1991 | Ojakaar |
| 5,032,655 A | 7/1991 | Moore |
| 5,262,490 A | 11/1993 | Kolb et al. |
| 5,266,650 A | 11/1993 | Guerra et al. |
| 5,268,405 A | 12/1993 | Ojakaar et al. |
| 5,285,002 A | 2/1994 | Grootaert |
| 5,349,093 A | 9/1994 | Oka et al. |
| 5,527,861 A | 6/1996 | Logothetis |
| 5,554,680 A | 9/1996 | Ojakaar |
| 5,565,512 A | 10/1996 | Saito et al. |
| 5,585,449 A | 12/1996 | Arcella et al. |
| 5,591,804 A | 1/1997 | Coggio et al. |
| 5,621,145 A | 4/1997 | Saito et al. |
| 5,639,837 A | 6/1997 | Farnham et al. |
| 5,654,375 A | 8/1997 | Jing et al. |
| 5,677,389 A | 10/1997 | Logothetis et al. |
| 5,681,881 A | 10/1997 | Jing et al. |
| 5,700,879 A | 12/1997 | Yamamoto et al. |
| 5,728,773 A | 3/1998 | Jing et al. |
| 5,756,588 A | 5/1998 | Kolb et al. |
| 5,767,204 A | 6/1998 | Iwa et al. |
| 5,789,489 A | 8/1998 | Couglin et al. |
| 5,789,509 A | 8/1998 | Schmiegel |
| 5,877,264 A | 3/1999 | Logothetis et al. |
| 5,910,552 A | 6/1999 | Saito et al. |
| 6,114,452 A | 9/2000 | Schmiegel |
| 6,211,319 B1 | 4/2001 | Schmiegel |
| 6,281,296 B1 | 8/2001 | MacLachlan et al. |
| 2002/0061977 A1 * | 5/2002 | Grootaert et al. ......... 525/326.3 |
| 2002/0145228 A1 * | 10/2002 | Kolb et al. .................. 264/236 |
| 2002/0177666 A1 * | 11/2002 | Grootaert et al. ......... 525/326.2 |

FOREIGN PATENT DOCUMENTS

| | | |
|---|---|---|
| EP | 0 140 207 A2 | 5/1985 |
| EP | 0 661 304 A1 | 7/1995 |
| EP | 0 708 139 A1 | 4/1996 |
| EP | 0 769 521 A1 | 4/1997 |
| EP | 0 784 064 A1 | 7/1997 |
| WO | WO 90/14368 | 11/1990 |
| WO | WO 99/48939 | 9/1999 |
| WO | WO 00/09569 | 2/2000 |
| WO | WO 00/09603 | 2/2000 |
| WO | WO 01/02448 | 1/2001 |
| WO | WO 01/59005 A2 | 7/2001 |

OTHER PUBLICATIONS

Yakubovich et al., "Syntheses in the 1,3,5–Triazine Series V. Iminoesters of Perfluorocarboxylic Acids–Synthese, Properties, and Mechanism of Cyclopolymerization to 1,3,5–Triazine Derivatives", pp. 878–885 (translated from *Zhurnal Obshchei Khimii*, vol. 36, No. 5, pp 863–871, May 1966).

Paciorek et al., "Reactions of Perfluronitriles. I. Interactions with Aniline", *Journal of Fluorine Chemistry*, 30 (1985), pp. 241–250.

\* cited by examiner

*Primary Examiner*—Bernard Lipman
(74) *Attorney, Agent, or Firm*—Dean M. Harts

(57) ABSTRACT

A composition comprising (a) a fluoropolymer having pendant imidate groups, which imidate groups have the formula: —C=NH(OR) wherein R is a $C_1$–$C_{10}$ aliphatic group which aliphatic group may have F or Cl substituents; and optionally, (b) a perfluorovinyl ether of the general formula: $CF_2=CFO(R'_fO)_a(R''_fO)_bR_f$ wherein $R'_f$ and $R''_f$ are the same or are different $C_1$–$C_6$ linear or branched perfluoroalkylene groups; a and b are, independently, 0 or an integer from 1 to 10; and $R_f$ is a $C_1$–$C_8$ perfluoroalkyl group or a $C_1$–$C_{15}$ perfluoroalkoxy group. Also provided are a method of making a fluoropolymer composition and curable and cured articles comprising a fluoropolymer composition.

26 Claims, No Drawings

FLUOROPOLYMERS HAVING PENDANT IMIDATE STRUCTURES

CROSS REFERENCE TO RELATED APPLICATION

This application claims priority to U.S. Provisional Patent Application No. 60/283,462, filed Apr. 12, 2001.

TECHNICAL FIELD

This invention relates to fluoropolymer compositions having imidate groups, to the curing therefrom and articles containing the at least partially cured compositions.

BACKGROUND

Fluorine-containing polymers (also known as "fluoropolymers") are a commercially useful class of materials. Fluoropolymers include, for example, crosslinked fluoroelastomers, uncrosslinked fluoroelastomer gums, and semi-crystalline fluoroplastics. Fluoroelastomers exhibit significant tolerance to high temperatures and to harsh chemical environments. Consequently, they are particularly well adapted for use as seals, gaskets, and other molded parts in systems that are exposed to elevated temperatures and/or harsh chemicals. Such parts are widely used in the chemical processing, semiconductor, aerospace, and petroleum industries, among others.

Fluoroelastomers often include a cure-site component to facilitate cure in the presence of a catalysts. One class of useful cure-site components includes nitrite group-containing monomers, which, in the presence of catalysts, form triazines. These cure-catalysts are typically organotin catalysts, ammonium salts, or ammonia-generating compounds. Such catalysts, however, may be toxic, and/or may release considerable amounts of ions such as undesirable extractable metal residues in the cured materials.

SUMMARY

In one aspect, the invention relates to a composition that a fluoropolymer having pendant imidate groups, which imidate groups have the formula: —C=NH(OR) wherein R is a $C_1$–$C_{10}$ (preferably $C_1$–$C_5$) aliphatic group which aliphatic group may have F or Cl substituents. The imidate groups can be attached directly to the polymer backbone, e.g., $F_2C=CF—C=NH(OR)$ or can be part of a longer side chain, e.g., $F_2C=CF—(CF_2)_m—(OR_f^1)_n—(OR_f^2)_p—(CF_2)_q—C=NH(OR)$, wherein $R_f^1$ is a perfluoroalkyl of 1 to 8, preferably 1 to 3, carbon atoms, $R_f^2$ is $R_f^1$ or a perfluoroalkoxy of 1 to 15, preferably 1 to 8, carbon atoms, and R is selected from an aliphatic group having from 1 to 10, preferably 1 to 5, carbon atoms which aliphatic group may have F or Cl substituents, m, n, p, and q are, independently, 0–10, and the imidate group can be terminal or at any other position along this longer side chain. The amounts of the imidate containing structure is from 0.01–5 mol %, preferably 0.2–3 mol %.

The fluoropolymer composition can further include perfluorovinyl ethers of the general formula

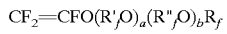

where $R'_f$ and $R''_f$ are the same or are different linear or branched perfluoroalkylene groups of 1–6 carbon atoms; a and b are, independently, 0 or an integer from 1 to 10; and $R_f$ is a perfluoroalkyl of 1 to 8, more preferably having 1 to 4 (most preferably 1) carbon atom(s), or a perfluoroalkoxy of 1 to 15, more preferably 1 to 8, carbon atom(s).

The fluoropolymer composition also may include interpolymerized units derived from tetrafluoroethylene (TFE), optionally chlorotrifluoroethylene (CTFE), and one or more ethylenically-unsaturated monomers represented by the formulas $CF_2=CF—R_f^1$, $CF_2=CF—O—R_f^2$, and $CH_2=CR_2$, wherein $R_f^1$ and $R_f^2$ are as defined above, and wherein each R is independently selected from an aliphatic group having from 1 to 10, preferably 1 to 5, carbon atoms which aliphatic group may have F or Cl substituents.

In other aspects, the invention provides a method of making a fluoropolymer comprising polymerizing a composition comprising (i) a fluoropolymer having a backbone, the fluoropolymer having interpolymerized units derived TFE, optionally CTFE, and one or more ethylenically-unsaturated monomers represented by the formulas $CF_2=CF—R_f^1$, $CF_2=CF—O—R_f^2$, and $CH_2=CR_2$ wherein $R_f^1$ is a $C_1$–$C_8$perfluoroalkyl, $R_f^2$ is $R_f^1$ or a $C_1$–$C_{15}$ perfluoroalkoxy, and each R is independently selected from H, F, Cl, or a $C_1$–$C_8$ aliphatic group which aliphatic group may have F or Cl substituents; and (ii) imidate groups pendant from the fluoropolymer backbone, which imidate groups have the formula: —C=NH(OR) wherein R is a $C_1$–$C_{10}$ aliphatic group which aliphatic group may have F or Cl substituents; and optionally, (iii) a perfluorovinyl ether of the general formula:

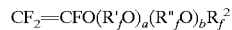

wherein $R'_f$ and $R''_f$ are the same or are different $C_1$–$C_6$ linear or branched perfluoroalkylene groups; a and b are, independently, 0 or an integer from 1 to 10; and $R_f^2$ is a $C_1$–$C_8$ perfluoroalkyl group or a $C_1$–$C_{15}$ perfluoroalkoxy group. This composition further can be shaped, cured, and optional heat aged.

The invention also provides fluoropolymer articles comprising the curable or cured compositions described.

The composition retains the advantages of fluoropolymers having nitrogen-containing cure site monomers such as the high temperature performance properties and chemical resistance typically achieved when organotin compounds are used as the catalyst system with such cure site monomers.

The inventive fluoropolymer system is substantially ion-free. In addition, low molecular weight cure promoters, e.g., perfluoro imidates or nitrites, can be incorporated into the inventive fluoropolymer system to adjust the processing parameters and/or end use properties.

The compositions are useful in applications where polymer stability (e.g., thermal stability) and/or chemical resistance are important. They are also useful in silicon wafer fabrication applications.

The details of presently preferred embodiments of the invention are set forth in the accompanying description below. Other features, objects, and advantages of the invention will be apparent from the description and from the claims.

DETAILED DESCRIPTION

The present invention includes a composition comprising a fluoropolymer having pendant imidate groups.

The fluoropolymers of the present invention preferably include interpolymerized units derived from at least two principal monomers. Examples of suitable candidates for the principal monomers include perfluoroolefins (e.g., tetrafluoroethylene and hexafluoropropylene), halo-substituted fluoroolefins (e.g., chlorotrifluoroethylene), perfluorovinyl ethers (e.g., perfluoroalkyl vinyl ethers and perfluoroalkoxy vinyl ethers), and optionally hydrogen-containing monomers such as olefins (e.g., ethylene, propylene, and the like) and vinylidene fluoride. Suitable perfluorinated vinyl ethers include those of the formula:

$$CF_2=CFO(R'_fO)_a(R''_fO)_bR_f \quad (1)$$

where $R'_f$, $R''_f$, $R_f$ are as defined above.

A preferred class of perfluoroalkyl vinyl ethers includes compositions of the formula:

$$CF_2=CFO(CF_2CFXO)_nR_f \quad (2)$$

where X is F or $CF_3$; n is 0–5, and $R_f$ is a perfluoroalkyl group of 1–8 carbon atoms.

Most preferred perfluoroalkyl vinyl ethers are those where, in reference to either Formula 1 or 2 above, n is 0 or 1 and $R_f$ contains 1–3 carbon atoms. Examples of such perfluorinated ethers include perfluoromethyl vinyl ether, perfluoroethyl vinyl ether, and perfluoropropyl vinyl ether.

Other useful perfluorinated monomers include those compounds of the formula:

$$CF_2=CFO[(CF_2)_m(CFZ)_uO]_nR_f \quad (3)$$

where $R_f$ is a perfluoroalkyl group having 1–8 carbon atoms, m is 1–5, u is 0–5, n is 0–5, and Z is F or $CF_3$. Preferred members of this class are those in which $R_f$ is $C_3F_7$, or $CF_3$, m is 1–2, u is 0–1, n is 1 and $Z=CF_3$.

Additional perfluoroalkyl vinyl ether monomers useful in the invention include those of the formula:

$$CF_2=CFO(CF_2CF(CF_3)O)_g(CF_2)_kO(CF_2)_pC_xF_{2x+1} \quad (4)$$

where g is 0 or an integer from 1–10, k is an integer from 1–6, p is 0–3, and x is 1–5. Preferred members of this class include compounds where g is 0 or 1, k is 1–5, p is 0 or 1, and x is 1.

Perfluoroalkoxy vinyl ethers useful in the invention include those of the formula:

$$CF_2=CFO(CF_2)_t[CF(CF_3)]_uO(CF_2O)_wC_xF_{2x+1} \quad (5)$$

wherein t is 1–3, u is 0–1, w is 0–3, and x is 1–5, preferably 1. Specific, representative, examples of useful perfluoroalkoxy vinyl ethers include $CF_2=CFOCF_2OCF_2CF_2CF_3$, $CF_2=CFOCF_2OCF_3$, $CF_2=CFO(CF_2)_3OCF_3$, and $CF_2=CFOCF_2CF_2OCF_3$.

The composition further includes a perfluorovinyl ether of the general formula:

$$CF_2=CF-[(O-CF_2-CF(CF_3))_n-O-(CF_2)_m-C=NH(OR) \quad (6)$$

wherein n, m, and R are as defined above. The functional perfluorovinyl ether allows one to cure the fluoropolymer without the disadvantages of catalyst systems known in the art.

Mixtures of perfluoroalkyl vinyl ethers and perfluoroalkoxy vinyl ethers may also be employed.

One example of a useful fluoropolymer is composed of principal monomer units of tetrafluoroethylene and at least one perfluoroalkyl vinyl ether. In such copolymers, the copolymerized perfluorinated ether units constitute from about 10 to about 45 mol % of total monomer units present in the polymer preferably 15–35 mol %.

In the case of fluoroelastomers, the polymers contain at least 50 mol % of interpolymerized units derived from TFE, CTFE, or hexafluoropropene (HFP). The balance of the interpolymerized units are derived from vinylethers and the cure site monomers.

In the case of partially fluorinated polymers, the polymers contain 5–95 mol % units of vinylidene fluoride (VDF), propylene, or ethylene and 95–4 mol % units of TFE, CTFE and/or HFP; up to 35 mol % vinylethers; and up to 5 mol % cure site monomers.

The polymers of the present invention have one or more pendant imidate structures of the formula —C=NH(OR). The imidates can be attached directly to the polymer backbone or with an alkyl chain (which may be substituted or unsubstituted) interposed between the polymer backbone and the imidate structure. For example,

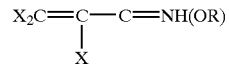

or by longer alkyl chains,

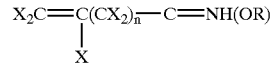

wherein X=F, Cl, Br, H, and n=1 to 50, preferably 1 to 20, more preferably 1 to 10. The interposed alkyl chain is preferably perfluorinated.

The imidate groups can also be attached by longer alkoxy side chains, e.g.,

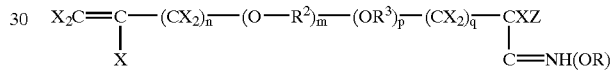

wherein R, $R^2$, and $R^3$ are independently selected from $C_1$–$C_{10}$ (preferably $C_1$–$C_5$) alkyls, which may be hydrogen-containing, partially-fluorinated, or perfluorinated, n and m are each independently 1 to 50, preferably 1 to 20, more preferably 1 to 10, p is 0 to 10, q is 0 to 10, X is H, F, Cl, or Br, and Z is F or $CF_3$. Perfluorinated alkoxy groups are preferred, in which case X is F.

The level of imidate units in the overall fluoropolymer composition is that amount sufficient to provide the desired physical properties in a selected material after curing. This level can vary from about 0.01 to about 5 mol % preferably from about 0.2 to about 3 mol %.

The imidate units are introduced into the polymers by copolymerization of the corresponding monomers. The monomers, e.g. the perfluorovinylether containing the imidate group can be prepared by known methods, for example as described in Z. obs. Khimi, Vol. 36, No. 9, pp 863–871, which is herein incorporated by reference. For example, one can quantitatively convert a nitrile-containing vinylether $(CF_2=CF_2-O-(CF)_5-CN)$ into an imidate by reacting a 1:1 mixture of vinylether and methanol in the presence of triethylamine (1%).

The imidates are often sensitive to aqueous environments. For this reason the preferred method to polymerize the imidate monomers, either as free imidates (i.e., —C=NH(OR)) or as a salt (e.g., —C=NH(OR.HX) wherein HX=HCl, or another organic or inorganic free acid), is via solvent polymerization.

The solvent polymerization is done e.g. in non-telogenic organic solvents, preferably haloperfluoro liquids, e.g., R113 or FC75. Any soluble radical initiator can be used, for example AIBN and bis perfluoroacyl peroxides of the formula:

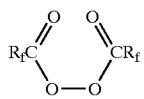

The polymerization is typically run at a temperature in the range of 25–80° C. and at a pressure in the range of 2–15 bar.

Alternatively, the imidate structure can be introduced by converting nitrile-containing polymers into imidates. One such technique involves providing a nitrile group containing vinyl ether corresponding to the target imidate group and reacting the nitrile group containing vinyl ether with an alcohol in the presence of a base. Using this technique, the more convenient aqueous emulsion polymerization for preparing the polymer can be used. In addition, the conversion step of converting nitrile groups can be carried out using a swelling agent such as those described below.

The nitrile containing fluoropolymers may be prepared by methods known in the art. For example, the polymerization process can be carried out by free-radical polymerization of the monomers as emulsions in water. Polymerization in an aqueous emulsion often is preferred because of the rapid and nearly complete conversion of monomers, easy removal of the heat of polymerization, and ready isolation of the polymer. Emulsion polymerization typically involves polymerizing monomers in an aqueous medium in the presence of an inorganic free-radical initiator system, such as ammonium persulfate or potassium permanganate, and a surfactant or suspending agent. Additionally, nitrile groups can be introduced through selected chain transfer agents like I—$(CF_2)_n$—CN, or by using a free-radical polymerization process can also be carried out in the presence of a perfluorosulfinate such as CN—$(CF_2)_n$—$SO_2M$, where in the two preceding formulas n is an integer from 1 to 10, more preferably 1 to 6, and wherein M represents a hydrogen atom or a cation with valence x, which is 1 or 2.

The imidate group is preferably introduced by converting nitrile (—CN) groups in selected polymers into imidate groups —C=NH(OR). The preferred conversion route of nitrile containing fluoropolymers involves the reaction of nitrites in the presence of an alcohol component and a base component at ambient temperatures. Alkyl alcohols having from 1 to 10 carbon atoms, which may be partially fluorinated, and combinations of more than one such material can be used for the alcohol component. The corresponding salt(s) of the selected alcohol or amines are preferred for the base component.

In the case of perfluoroelastomers, at least one swelling agent is preferably added to the polymers. Such swelling agent(s) can be a partially fluorinated compound such as a hydrofluoroether (HFE), (e.g., Novec™ Engineered Fluid HFE-7100 or 7200 commercially available from 3M Company, St. Paul, Minn. (3M)), or any other fluorine containing liquid, e.g., $FC_{75}$ (Fluorinert™ fluorocarbon solvent, also from 3M). The conversion of the polymer pendant nitrile groups is preferably performed at room temperature or at a slightly higher temperature. In general, any fluorine containing inert liquid or any fluorine containing alkanol with a boiling point at least about 40° C., preferably at least about 50° C. can be used.

In the case of nonperfluorinated elastomers, a swelling agent also can be used. Preferred swelling agents include alcohols, inert hydrocarbon solvents, and fluorinated compounds. The necessary bases are preferably selected from alkoxides or organic amines, e.g., sodium methylate or ethylate, trialkylamines, aryl-containing trialkylamine, pyridine, etc. The amounts necessary to convert the nitrites are from 0.05–10 weight percent (wt %) based on the amount of polymer, preferably 0.1–5 wt %.

To convert the nitrile group(s), the mixture of polymer, swelling agent, alcohol, and base is normally refluxed, although the reaction proceeds at room temperature.

Complete conversion of the nitrile groups to imidate groups is not necessary. For example, the ratio of nitrile groups to imidate groups can be from about 90:10 to 0:100. It is preferred to convert at least 50% of the nitrile groups into imidate functions, especially preferred to convert 60% of the nitrile groups and most preferred 80% of the nitrites.

The fluoropolymer compositions are preferably cured by heating the curable material to an elevated temperature. The actual temperature chosen is controlled by factors including the ratio of nitrites converted to imidates, the level of low molecular weight perfluoro imidates, the level of nitrites and/or imidates to the level of fluoropolymer component, the desired curing rate, and the desired scorch resistance. Typically, a cure temperature above about 150° C. is preferred.

The fluoropolymer additionally can have interpolymerized units derived from cure site monomers other than the inventive imidate groups. For example the fluoropolymer can have nitrile groups, introduced e.g. by copolymerization of the well known nitrile-containing vinylethers, such as $CF_2=CFO(CF_2)_LCN$; $CF_2=CFO[CF_2CF(CF_3)O]_q(CF_2O)_yCF(CF_3)CN$; $CF_2=CF[OCF_2CF(CF_3)]_rO(CF_2)_tCN$; and $CF_2=CFO(CF_2)_uOCF(CF_3)CN$; where, in reference to these formulas, L=2–12; q=0–4; r=1–2; y=0–6; t=1–4; and u=2–6. Representative examples of such monomers include $CF_2=CFO(CF_2)_3OCF(CF_3)CN$, perfluoro(8-cyano-5-methyl-3,6-dioxa-1-octene), and $CF_2=CFO(CF_2)_5CN$.

Another suitable cure site component useful in the present invention is a fluoropolymer or fluorinated monomer material containing a halogen that is capable of participation in a peroxide cure reaction. Such a halogen may be present along a fluoropolymer chain and/or in a terminal position. Typically the halogen is bromine or iodine. Copolymerization is preferred to introduce the halogen in a position along a fluoropolymer chain. In this route, a selection of the fluoropolymer components mentioned above is combined with a suitable fluorinated cure site monomer. Such a monomer can be selected, for example, from the general formula Z—$R_f$—$O_x$—CF=$CF_2$, wherein Z is Br or I, $R_f$ is a substituted or unsubstituted $C_1$–$C_{12}$ fluoroalkylene, which may be perfluorinated and may contain one or more ether oxygen atoms, and x is 0 or 1. When x is 0, examples of the bromo- or iodo-fluorolefins include bromodifluoroethylene, bromotrifluoroethylene, iodotrifluoroethylene, 1-bromo-2,2-difluoroethylene, and 4-bromo-3,3,4,4-tetrafluorobutene-1, and the like. When x is 1, examples of the bromo- or iodo-fluorovinyl ethers include: $BrCF_{20}CF=CF_2$, $BrCF_2CF_2OCF=CF_2$, $BrCF_2CF_2CF_2OCF=CF_2$, $CF_3CF(Br)CF_2OCF=CF_2$, and the like. In addition, nonfluorinated bromo- or iodo-olefins, e.g., vinyl bromide and 4-bromo-1-butene, can be used.

The amount of these additional cure site monomers is in the range from about 0.01 to about 5 mol % (more preferably from about 0.1 to about 3 mol %).

The fluoropolymer compositions can also be cured using one or more peroxide curatives. Suitable peroxide curatives generally are those that generate free radicals at curing temperatures. Dialkyl peroxide and bis(dialkyl peroxide), each of which decomposes at a temperature above 50° C., are especially preferred. In many cases it is preferred to use a di-tertiarybutyl peroxide having a tertiary carbon atom attached to peroxy oxygen atom. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from such compounds as dicumyl peroxide, dibenzoyl peroxide, tertiarybutyl perbenzoate, a,a'-bis(t-butylperoxy-diisopropylbenzene), and di[1,3-dimethyl-3-(t-butylperoxy)-butyl]carbonate. Generally, about 1 to 3 parts of peroxide per 100 parts of fluoropolymer (phr) is used.

The fluoropolymer compositions can be cured using divalent metal amine complex catalysts, alone or in various combinations as described in copending patent applications U.S. Ser. No. 60/233,386 entitled "Imidate-Containing Fluoropolymer Compositions" and U.S. Ser. No. 60/233,383 entitled "Metal Amine Complex Containing Fluoropolymer Compositions", both filed on 18 Sep. 2000, the disclosures of which are herein incorporated by reference. Such divalent metal amine complex compounds are represented by the general formula:

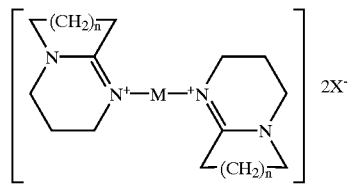

wherein M is a divalent metal, X is an anionic group, and n is 2 to 8, preferably 3 to 6, more preferably 3 or 5. Examples of suitable divalent metals include magnesium, nickel, zinc, cobalt, lead, iron, tin, cadmium, and calcium, with magnesium and zinc being preferred. Examples of suitable anionic groups include halide (e.g., chloride, bromide, or iodide), hydroxylate, alkoxylate, carboxylate, phenoxide, sulfonate, sulfate, sulfite, carbonate, and nitrate groups, with halides such as chlorides being preferred. This formula includes, for example, complexes of 1,8-diazabicyclo[5,4,0]undec-7-ene (DBU) and 1,5-diazabicyclo [4,3,0]non-5-ene (DBN). These complexes may be prepared, for example, by reacting DBU or DBN with a metal salt (e.g., a metal halide) in an organic solvent such as methanol or acetone according to the procedure described in U.S. Pat. No. 4,833,212. U.S. Pat. No. 4,833,212. In addition, more than one such complex can be used.

The fluoropolymer compositions can be cured using a catalyst composition that includes a compound having the general formula $\{RA\}^{(-)}\{QR''_k\}^{(+)}$, wherein R is a hydrogen-containing, partially fluorinated, or perfluorinated $C_1$–$C_{20}$ alkyl or alkenyl, $C_3$–$C_{20}$ cycloalkyl, $C_6$–$C_{20}$ cycloalkenyl, or $C_6$–$C_{20}$ aryl or alkylaryl, or perfluorinated $C_6$–$C_{20}$ aryl or alkylaryl; A is an acid anion or an acid derivative anion, Q is phosphorous, sulfur, nitrogen, arsenic, or antimony, k is the valence of Q, and each R" is, independently, hydrogen or a substituted or unsubstituted $C_1$–$C_{20}$ alkyl, aryl, aralkyl, or alkenyl group. In one embodiment when Q is nitrogen, not every R" is hydrogen. More detail is provided in copending applications U.S. Ser. No. 60/283,535 (Attorney Docket Number 56367USA49), U.S. Ser. No. 60/283,464 (Attorney Docket Number 56443USA29), filed on Apr. 12, 2001, U.S. Ser. No. 60/265,498 (Attorney Docket Number 56311USA19) filed on Jan. 31, 2001, and U.S. Ser. No. 10/060,690 filed on Jan. 30, 2002 (Attorney Docket Number 56311US007), the disclosures of which are herein incorporated by reference.

Generally, the amount of curative is in the range of 0.01 to 10 (more preferably 0.5 to 5) parts per hundred parts fluoropolymer (phr).

The fluoropolymer compositions can include any of the adjuvants commonly employed in curable fluoropolymer formulations. For example, one material often blended with a fluoropolymer composition as a part of the peroxide curative system is a coagent (sometimes also referred to as a co-curative) composed of a polyunsaturated compound that is capable of cooperating with the curative to provide a useful cure. These coagents can generally be added in an amount equal to between 0.1 and 10 parts coagent per hundred parts fluoropolymer (phr), preferably between 1 and 5 phr. Examples of useful coagents include triallyl cyanurate; triallyl isocyanurate; tri(methylallyl)isocyanurate; tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; and tri(5-norbornene-2-methylene)cyanurate. Particularly useful is triallyl isocyanurate. Other useful coagents include the bis-olefins disclosed in EP 0 661 304 A1, EP 0 784 064 A1, EP 0 769 521 A1, and U.S. Pat. No. 5,585,449.

The fluoropolymer compositions can also be cured by using other types of curatives along with the integral imidate when the undesirable features of the known curing system is tolerable. Examples of such curatives are known and include bis-aminophenols (e.g., as described in U.S. Pat. Nos. 5,767,204 and 5,700,879), bis-amidooximes (e.g., as described in U.S. Pat. No. 5,621,145), and ammonium salts (e.g., as described in U.S. Pat. No. 5,565,512). Organometallic compounds of arsenic, antimony and tin also can be used, for example as described in U.S. Pat. Nos. 4,281,092; and 5,554,680. Particular examples include allyl-, propargyl-, triphenylallenyl-, and tetraphenyltin and triphenyltin hydroxide.

In addition, the integral imidate cure system can be modified by methods known in the art. For example, ammonia-generating compounds may be included to modify the rate of cure of a particular composition, although such modification may also remove one or more advantages of the present invention. Such ammonia-generating compounds are typically solid or liquid at ambient conditions, and then generate ammonia under conditions of cure. These compounds include, for example, hexamethylene tetramine (urotropin) and dicyan diamid, as well as metal-containing compounds and triazine derivatives. More detail regarding such ammonia-generating compounds is found in PCT publication WO 00/09603, which is herein incorporated by reference.

It may be advantageous for tailoring processing properties and final end properties to add one or more onium salts to the fluoropolymer compositions. Examples of suitable onium salts are described in U.S. Pat. No. 4,882,390. Specific examples include triphenylbenzyl phosphonium chloride, tributyl alkyl phosphonium chloride, tributyl benzyl ammonium chloride, tetrabutyl ammonium bromide, and triarylsulfonium chloride.

Additives such as carbon black, stabilizers, plasticizers, lubricants, fillers, and processing aids typically utilized in fluoropolymer compounding can be incorporated into the compositions, provided they have adequate stability for the intended service conditions. In particular, low temperature performance can be enhanced by incorporation of perfluoropolyethers. See, for example, U.S. Pat. No. 5,268,405.

Carbon black fillers are typically also employed in fluoropolymers as a means to balance modulus, tensile strength, elongation, hardness, abrasion resistance, conductivity, and processability of the compositions. Suitable examples include MT blacks (medium thermal black) designated N-991, N-990, N-908, and N-907; FEF N-550; and large particle size furnace blacks. When large size particle black is used, 1 to 70 parts filler per hundred parts fluoropolymer (phr) is generally sufficient.

Fluoropolymer fillers may also be present in the curable compositions. Generally, from 1 to 50 phr of fluoropolymer filler is used. The fluoropolymer filler can be finely divided and easily dispersed as a solid at the highest temperature used in fabrication and curing of the inventive composition. By solid, it is meant that the filler material, if partially crystalline, will have a crystalline melting temperature above the processing temperature(s) of the curable composition(s). The preferred way to incorporate fluoropolymer filler is by blending latices. This procedure, including various kinds of fluoropolymer filler, is described in U.S. Ser. No. 09/495,600, filed 01 Feb. 2000, the disclosure of which is herein incorporated by reference.

One or more acid acceptors can also be added to the formulations. However, where the presence of extractable metallic compounds is undesirable (such as for semiconductor applications) the use of inorganic acid acceptors should be minimized, and preferably avoided altogether. Commonly used acid acceptors include, for example, zinc oxide, calcium hydroxide, calcium carbonate, magnesium oxide, etc. These compounds generally are used in the fluoropolymer formulation to bind any HF or other acids that might be generated at the high temperatures where the fluoropolymers are intended to function.

The curable fluoropolymer compositions of the invention may also be combined with other curable fluoropolymer compositions such as peroxide-curable fluoropolymer compositions. These additional curable fluoropolymer compositions typically employ small amounts of cure site monomers as a comonomer. Suitable cure site monomers are those which, when combined with a curative (e.g., a peroxide) and, preferably a coagent, will provide a cured composition. Preferably these cure site monomers include at least one halo group (e.g., a bromo or an iodo group).

The curable fluoropolymer compositions can be prepared by mixing the fluoropolymer, the catalyst, the selected additive or additives, additional curatives (if any), and the other adjuvants, if any, in conventional rubber processing equipment. The desired amounts of compounding ingredients and other conventional adjuvants or ingredients can be added to the curable fluorocarbon gum stock and intimately admixed or compounded therewith by employing any of the usual rubber mixing devices such as internal mixers, (e.g., Banbury mixers), roll mills, or any other convenient mixing device. The temperature of the mixture during the mixing process typically should not rise above about 120° C. During mixing, it is preferable to distribute the components and adjuvants uniformly throughout the gum for effective cure.

The mixture is then processed and shaped, such as by extrusion (for example, in the shape of a hose or hose lining) or by molding (for example, in the form of an O-ring seal). The shaped article can then be heated to cure the gum composition and form a cured article.

Pressing of the compounded mixture (i.e., press cure) usually is conducted at a temperature sufficient to cure the mixture in a desired time duration under a suitable pressure. Generally, this is between about 95° C. and about 230° C., preferably between about 150° C. and about 205° C., for a period of from about 1 minute to 15 hours, typically from 5 minutes to 30 minutes. A pressure of between about 700 kPa and about 20,600 kPa is usually imposed on the compounded mixture in a mold. The molds first may be coated with a release agent and prebaked. The molded vulcanizate is then usually post-cured (e.g., in an oven) at a temperature and for a time sufficient to complete the post-curing, usually between about 150° C. and about 300° C., typically at about 232° C., for a period of from about 2 hours to 50 hours or more, generally increasing with the cross-sectional thickness of the article. For thick sections, the temperature during the post cure is usually raised gradually from the lower limit of the range to the desired maximum temperature. The maximum temperature used is preferably about 300° C., and this value is held for about 4 hours or more.

Following cure, the article may be heat aged in air. A typical example of a heat aging protocol is to age the article in air for about 70 hours at a temperature of about 290° C.

The fluoropolymer compositions are useful in production of articles such as O-rings, gaskets, tubing, and seals. Such articles are produced by molding a compounded formulation of the fluoropolymer composition with various additives under pressure, curing the article, and then subjecting it to a post-cure cycle. The curable compositions formulated without inorganic acid acceptors are particularly well suited for applications such as seals and gaskets for manufacturing semiconductor devices, and in seals for high temperature automotive uses.

The invention will now be described further by way of the following examples.

EXAMPLES

Example 1

A fluoroelastomer was prepared by emulsion polymerization which contained 62.2 mol % TFE, 36.6 mol % perfluoro (methyl vinyl ether) and 1.2 mol % $CF_2=CF-O-(CF_2)_5-CN$. The coagulated and dried gum was pressed into films.

Three pressed-films having a thickness of about 300 $\mu$m were placed into a mixture of 50 mL of methanol and 0.5 g of triethylamine. A swelling agent (20 ml of HFE 7100, available from 3M) was included in one of the samples. The conversion of nitrile groups into imidate groups was monitored via FTIR measurements at 2264 $cm^{-1}$ for the —CN absorption and at 1685 $cm^{-1}$ for the —C=NH absorption. Increasing the temperature from room temperature (RT) to 65° C. reduced the conversion time and increased the conversion percentage. Including a swelling agent also reduced the conversion time and dramatically increased the conversion percentage. The duration of the exposures and the conversion levels are reported below:

| Ex. No. | Swelling agent | Temp. | Time | Conversion (%) |
|---|---|---|---|---|
| 1A | No | RT | 1 week | 15 |
| 1B | No | 65° C. | 3 days | 30 |
| 1C | Yes | RT | 3 days | 95 |

Example 2

A mixture of 350 g of a polymer (62.2 mol % TFE, 36.5 mol % PMVE and 1.3 mol % $CF_2=CF-O-(CF_2)_5CN$), 1000 g Methanol, 10 g triethylamine and 500 g HFE 7100 was refluxed (~60° C.) for 4 days. The nitrile groups were 97% converted to imidates.

A number of embodiments of the invention have been described. Nevertheless, it will be understood that various modifications may be made without departing from the spirit and scope of the invention.

What is claimed is:

1. A composition comprising a fluoropolymer having:
   (a) pendant imidate groups, which imidate groups have the formula: —C=NH(OR) wherein R is a $C_1$–$C_{10}$ aliphatic group which aliphatic group may have F or Cl substituents; and optionally,
   (b) interpolymerized unit of a perfluoro(vinyl ether) of the general formula: $CF_2$=$CFO(R'_fO)_a(R''_fO)_bR_f$ wherein $R'_f$ and $R''_f$ are the same or are different $C_1$–$C_6$ linear or branched perfluoroalkylene groups; a and b are, independently, 0 or an integer from 1 to 10; and $R_f$ is a $C_1$–$C_8$ perfluoroalkyl group or a $C_1$–$C_{15}$ perfluoroalkoxy group.

2. The composition of claim 1 wherein the fluoropolymer further comprises interpolymerized units derived from tetrafluoroethylene (TFE) and/or chlorotrifluoroethylene (CTFE); and optionally, one or more ethylenically-unsaturated monomers represented by the formulas $CF_2$=$CF$—$R_f^1$, $CF_2$=$CF$—$O$—$R_f^2$, and $CH_2$=$CR_2^1$, wherein $R_f^1$ is a $C_1$–$C_8$ perfluoroalkyl, $R_f^2$ is $R_f^1$ or a $C_1$–$C_{15}$ perfluoroalkoxy, and $R^1$ is selected from H, F, Cl, or a $C_1$–$C_8$ aliphatic group which aliphatic group may have F or Cl substituents.

3. The composition of claim 1 wherein the pendant imidate groups are attached directly to a fluoropolymer backbone.

4. The composition of claim 1 wherein at least some of the pendant imidate groups have a substituted or unsubstituted alkylene chain interposed between said pendant imidate groups and the polymer backbone.

5. The composition of claim wherein at least some of the pendant imidate groups have a substituted or unsubstituted oxyalkylene chain interposed between said pendant imidate groups and the polymer backbone.

6. The composition of claim 5 wherein the pendant imidate having an interposed alkyl chain and alkoxy side chains is of the formula:

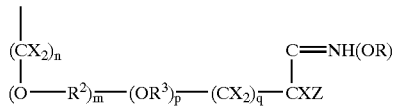

wherein R, $R^2$, and $R^3$ are independently selected from $C_1$–$C_{10}$ alkyls, which may be hydrogen-containing, partially-fluorinated, or perfluorinated, n and m are each independently 1 to 50, p is 0 to 10, q is 0 to 10, X is H, F, Cl, or Br, and Z is F or $CF_3$.

7. The composition of claim 1 further comprising interpolymerized units derived from a cure site monomer other than the pendant imidate.

8. The composition of claim 1 wherein the fluoropolymer is perfluorinated or partially fluorinated.

9. The composition of claim 1 further comprising one or more peroxide curatives.

10. An article comprising the curable or cured composition of claim 1.

11. The composition of claim 1 further comprising one or more divalent metal amine complex catalysts.

12. The composition of claim 1 further comprising one or more coagent(s).

13. The composition of claim 1 further comprising an additional curative selected from bis-aminophenols, bis-amidooximes, ammonium salts, ammonia-generating compounds, and organometallic compounds of arsenic, antimony and tin.

14. The composition of claim 1 further comprising a catalyst composition that includes a compound having the general formula $\{RA\}^{(-)}\{QR''_k\}^{(+)}$, wherein R is a hydrogen-containing, partially fluorinated, or perfluorinated $C_1$–$C_{20}$ alkyl or alkenyl, $C_3$–$C_{20}$ cycloalkyl, $C_6$–$C_{20}$ cycloalkenyl, or $C_6$–$C_{20}$ aryl or alkylaryl, or perfluorinated $C_6$–$C_{20}$ aryl or alkylaryl; A is an acid anion or an acid derivative anion, Q is phosphorous, sulfur, nitrogen, arsenic, or antimony, k is the valence of Q, and each R" is, independently, hydrogen or a substituted or unsubstituted $C_1$–$C_{20}$ alkyl, aryl, aralkyl, or alkenyl group.

15. A composition according to claim 1 wherein the fluoropolymer comprises interpolymerized units derived from
   (i) tetrafluoroethylene, and
   (ii) one or more perfluoro(vinyl ethers) having a formula selected from the group consisting of:
   (a) $CF_2$=$CFO(R'_fO)_a(R''_fO)_bR_f$;
   (b) $CF_2$=$CFO(CF_2CFXO)_nR_f$;
   wherein X is F or $CF_3$; n is 0–5, and $R_f$ is a $C_1$–$C_6$ perfluoroalkyl group;
   (c) $CF_2$=$CFO[(CF_2)_m(CFZ)_uO]_nR_f$;
   wherein $R_f$ is a $C_1$–$C_6$ perfluoroalkyl group, m is 1–5, u is 0–5, n is 0–5, and Z is F or $CF_3$;
   (d) $CF_2$=$CFO[(CF_2CF(CF_3)O)_g(CF_2)_kO(CF_2)_p]C_xF_{2x+1}$;
   wherein g is 0 or an integer from 1–10, k is an integer from 1–6, p is 0–3, and x is 1–5;
   (e) $CF_2$=$CFO(CF_2)_t[CF(CF_3)]_uO(CF_2O)_wC_xF_{2x+1}$;
   wherein t is 1–3, u is 0–1, w is 0–3, and x is 1–5; and
   (f) $CF_2$=$CF$—$[(O$—$CF_2$—$CF(CF_3))]_n$—$O$—$(CF_2)_m$—$C$=$NH(OR_f)$.

16. The composition of claim 15 wherein the one or more perfluoro(vinyl ether)(s) are selected from perfluoro(methyl vinyl ether), perfluoro(ethyl vinyl ether), and perfluoro(propyl vinyl ether).

17. The composition of claim 15 wherein the one or more perfluoro(vinyl ether)(s) are selected from $CF_2$=$CFOCF_2OCF_2CF_2CF_3$, $CF_2$=$CFOCF_2OCF_3$, $CF_2$=$CFO(CF_2)_3OCF_3$, and $CF_2$=$CFOCF_2CF_2OCF_3$.

18. The composition of claim 15 wherein the one or more perfluoro(vinyl ether)(s) comprise from about 10 to about 45 mol % of total monomer units present in the fluoropolymer.

19. The composition of claim 1 wherein the fluoropolymer comprises a fluoroelastomer containing at least 50 mol % of interpolymerized units derived from at least one of TFE, CTFE, and HFP.

20. The composition of claim 1 wherein the fluoropolymer comprises interpolymerized units derived from one or more hydrogen-containing monomers, which may have F or Cl substituents.

21. A composition according to claim 1 wherein the fluoropolymer further comprises interpolymerized units derived from monomers selected from the group consisting of perfluoroolefins, partially-fluorinated olefins, non-fluorinated olefins, vinylidene fluoride, and combinations thereof.

22. A method of making a fluoropolymer comprising polymerizing a composition comprising:
   (i) a fluoropolymer having a backbone, the fluoropolymer having interpolymerized units derived from tetrafluoroethylene (TFE), optionally chlorotrifluoroethylene (CTFE) and one or more ethylenically-unsaturated monomers represented by the formulas $CF_2$=$CF$—$R_f^1$, $CF_2$=$CF$—$O$—$R_f^2$, and $CH_2$=$CR_2$ wherein $R_f^1$ is a $C_1$–$C_8$ perfluoroalkyl, $R_f^2$ is $R_f^1$ or a $C_1$–$C_{15}$ perfluoroalkoxy, and each R is independently selected from H, F, Cl, or a $C_1$–$C_8$ aliphatic group which aliphatic group may have F or Cl substituents; and (ii) a monomer having an imidate group pendant from the fluoropolymer backbone, which imidate group has the formula:

—C=NH(OR)

wherein R is a $C_1$–$C_{10}$ aliphatic group which aliphatic group may have F or Cl substituents; and optionally, (iii) interpolymerized units of a perfluoro(vinyl ether) of the general formula:

$CF_2=CFO(R'_fO)_a(R''_fO)_bR_f^2$ wherein $R'_f$ and $R''_f$ are the same or are different $C_1$–$C_6$ linear or branched perfluoroalkylene groups; a and b are, independently, 0 or an integer from 1 to 10; and $R_f^2$ is a $C_1$–$C_8$ perfluoroalkyl group or a $C_1$–$C_{15}$ perfluoroalkoxy group.

23. The method of claim 22 further comprising shaping the mixture; curing the shaped mixture; and optionally heat aging the cured mixture.

24. The method of claim 22 wherein the pendant imidate groups are introduced by converting nitrile groups.

25. The method of claim 24 wherein the imidate groups are introduced into the fluoropolymer composition through the steps of a) providing a nitrile group containing vinyl ether corresponding to the target imidate group; and b) reacting the nitrile group containing vinyl ether with an alcohol in the presence of a base.

26. The method of claim 24 wherein the step of converting nitrile groups is carried out using a swelling agent.

* * * * *

UNITED STATES PATENT AND TRADEMARK OFFICE
CERTIFICATE OF CORRECTION

PATENT NO.    : 6,803,425 B2
DATED         : October 12, 2004
INVENTOR(S)   : Hintzer, Klaus It is certified that error appears in the above-identified patent and that said Letters Patent is hereby corrected as shown below:

Column 2,
Line 44, "nirites" should read -- nitriles --

Column 4,
Line 59, "-C=NH(OR.HX)" should read -- -C=NH(OR·HX) --

Column 5,
Line 55, "$FC_{75}$" should read -- FC 75 --

Column 6,
Lines 12, 16 and 17, "nitrites" should read -- nitriles --
Line 53, $BrCF_{20}CF=CF_2$," should read -- $BrCF_2OCF=CF_2$,--

Column 11,
Line 31, "claim wherein" should read -- claim 1 wherein --

Column 12,
Line 16, "(vinyl ethers)" should read -- (vinyl ether)(s) --

Signed and Sealed this

Twenty-ninth Day of March, 2005

JON W. DUDAS
*Director of the United States Patent and Trademark Office*